(12) United States Patent
Choi

(10) Patent No.: US 8,902,199 B2
(45) Date of Patent: Dec. 2, 2014

(54) INFRARED TOUCH SCREEN DEVICE CAPABLE OF MULTI-TOUCH POINTS SENSING

(75) Inventor: Dai-Kyu Choi, Yongin-si (KR)

(73) Assignee: AFO Co., Ltd., Yongin-si (KR)

(*) Notice: Subject to any disclaimer, the term of this patent is extended or adjusted under 35 U.S.C. 154(b) by 116 days.

(21) Appl. No.: 13/405,861

(22) Filed: Feb. 27, 2012

(65) Prior Publication Data

US 2012/0293461 A1  Nov. 22, 2012

(30) Foreign Application Priority Data

May 20, 2011  (KR) .................. 10-2011-0047676

(51) Int. Cl.
*G06F 3/042* (2006.01)

(52) U.S. Cl.
CPC .................. *G06F 3/0423* (2013.01)
USPC .................. 345/175; 345/173

(58) Field of Classification Search
CPC ... G06F 3/0421; G06F 3/0488; G06F 3/0423; G06F 3/042

USPC .................. 345/175, 173
See application file for complete search history.

(56) References Cited

U.S. PATENT DOCUMENTS

2001/0002694 A1* 6/2001 Nakazawa et al. ............ 250/221
2010/0259507 A1* 10/2010 Yen et al. ...................... 345/175

* cited by examiner

*Primary Examiner* — Abbas Abdulselam
*Assistant Examiner* — Shawna Stepp Jones
(74) *Attorney, Agent, or Firm* — Jefferson IP Law, LLP

(57) ABSTRACT

An infrared touch screen device capable of smoothly sensing contact positions of a plurality of touch points and sensing multi-touch points, when a plurality of touch points are produced, are provided. The infrared touch screen comprises a screen provided with a display panel on which an image is projected and a reinforced glass plate formed on a front surface of the display panel, a reinforced glass plate formed on a front surface of the screen to protect the screen and on which a touch is made, an optical scanner formed on one side of the screen and scanning the screen with the infrared, a light guide bar formed on a border of the reinforced glass plate, a light receiving portion provided on a distal end of the light guide bar, and a position detector for detecting the touch position with a scanning angle of the optical scanner.

13 Claims, 10 Drawing Sheets

US 8,902,199 B2

INFRARED TOUCH SCREEN DEVICE CAPABLE OF MULTI-TOUCH POINTS SENSING

PRIORITY

This application claims the benefit under 35 U.S.C. §119(a) of a Korean patent application filed on May 20, 2011, in the Korean Intellectual Property Office and assigned Serial No. 10-2011-0047676, the entire disclosure of which is hereby incorporated by reference.

BACKGROUND OF THE INVENTION

1. Field of the Invention

The present invention relates to an infrared touch screen device. More particularly, the present invention relates to an infrared touch screen device capable of smoothly sensing the contact positions of a plurality of touch points and sensing multi-touch points when a plurality of touch points are produced.

2. Description of the Related Art

Generally, a touch screen device perceives the positions of characters and specific icons displayed on a picture by contacting them with objects such as man's hands or pen, or the like, without using an input device such as a mouse, and calculates input signal and performs a specific function.

This touch screen device is classified as a resistance film way, a capacitance way, an ultrasound way and a infrared way, depending on a way of calculating the position to be contacted on a screen wherein the resistance film way and the capacitance way have been mainly used.

Among the position calculating ways, the infrared way will be described hereinafter.

FIG. 1 is a perspective view showing a configuration of an infrared touch screen device according to the related art.

As shown in FIG. 1, a first and second light emitting portions 13, 14 provided on one of upper side and bottom side and on one of left side and right side, respectively, of an infrared way-touch panel are arranged in the infrared way-touch panel to which an infrared way is applied wherein the first and second light emitting portions including a plurality of infrared emitting elements 12 for lighting laser (infrared) along an outline of a screen 10.

Furthermore, a first and second light receiving portions 17, 18 including a plurality of light receiving elements 16 are arranged, respectively, on one of left and right sides and on one of upper and bottom side of the outline of the screen 10 where the first and second light emitting portions 17, 18 are not provided.

As a result, the laser beams pass as a matrix form between the first and second light emitting portions 13, 14 and the first and second light receiving portions 17, 18 on the screen 10. Accordingly, when a user' finger or a pen, or the like contacts a specific portion on the screen 10, the light in contact with the finger or the pen, or the like is to be blocked.

As a result, the light is not incident to the first and second light receiving portions 17, 18 at the contacted position on the screen 10.

The touch screen device recognizes the contacted position by sensing the position from which the light is not incident to the first and second light receiving portions 17, 18 and transfers the sensed information to X/Y decoder 19.

However, according to the prior infrared way, even though a plurality of infrared lighting elements and light receiving elements are used, there is a limitation to detecting simultaneously a plurality of touch points.

Further, the screen may be damaged by touching it with a finger or a pen, or the like.

In addition, since a resolution ability with respect to the contacted position on the screen is determined depending on the numbers of the infrared lighting elements and the light receiving elements, the numbers of the light emitting elements and the light receiving elements have to be increased in order to improve the resolution ability, and thereby increasing a production cost of the screen.

Therefore, a need exists for a system and method for performing a self diagnosis of a device without the inconvenience caused when manually selecting a self diagnosis item from a computer or a user interface.

SUMMARY OF THE INVENTION

Aspects of the present invention are to address at least the above-mentioned problems and/or disadvantages and to provide at least the advantages described below. Accordingly, an aspect of the present invention is to provide an infrared touch screen device capable of exactly detecting the respective contact positions and sensing multi-touch points when a plurality of touch points are produced on a screen.

Another aspect of the present invention is to provide an infrared touch screen device capable of sensing multi-touch points to avoid a screen damage produced due to touching the screen.

Another aspect of the present invention is to provide an infrared touch screen device capable of sensing multi-touch points, to which a rotating infrared scanner is attached to decrease the numbers of the infrared emitting elements and the light receiving elements while not reducing detection accuracy when detecting the touch positions produced on the screen.

Another aspect of the present invention is to provide an infrared touch screen device capable of operating the infrared emitting element to emit light by using self-induced current, without using an external power source.

In accordance with an embodiment of the present invention, an infrared touch screen capable of sensing multi touch points is provided. The infrared touch screen includes a screen provided with a display panel on which an image is projected and a reinforced glass plate formed on a front surface of the display panel and protects the display panel and to which the touch is made, an optical scanner formed on one side of the screen and scanning the screen with the infrared, a light guide bar formed on a border of the reinforced glass plate and reflecting a part of the infrared which is projected from the optical scanner and passes through the reinforced glass plate, and guiding the rest non-reflected infrared incident inside the reinforced glass plate and transferring to one end thereof, a light receiving portion provided on a distal end of the light guide bar and receiving the infrared which is transferred through the light guide bar, and a position detector for detecting the touch position with a scanning angle of the optical scanner when the amount of the light received in the light receiving portion is a little wherein the infrared reflected from the light guide bar in incident to other light guide bars which are formed, corresponding to the light guide bar reflecting the infrared.

The optical scanner comprises an infrared emitting element for emitting infrared, a rotation part for rotating the infrared emitted from the infrared emitting element and scanning the entire area of the screen, a driving part for applying a rotation force to the rotation part, and an angle measuring part provided on one side of the driving part for measuring a rotation angle of the rotation part.

The driving part comprises a rotation magnet formed rotatively as a circular plate and forming the rotation part in a same direction, and a driving electromagnet provided on one side of the rotation magnet and receiving power to produce a magnetic power and rotating the rotation part.

The infrared emitting element receives the induced current produced in the stationary magnet to emit infrared.

The optical scanner comprises an infrared emitting element for emitting infrared, a rotation part which is rotated in both directions for the infrared emitted from the infrared emitting element to scan the entire area of the screen, a driving part for rotating the rotation part in both directions, and an angle measuring part provided on one side of the driving part for measuring a rotation angle of the rotation part.

The driving part comprises a rotation electromagnet provided inside the rotation part and receiving power to produce a magnetic force, and a stationary magnet provided on a rear side of the rotation part, correspondingly to the rotation electromagnet and receiving power to produce a magnetic force.

The driving part is formed with a motor.

The light guide bar comprises a projection surface on which the infrared emitted from the optical scanner is projected, and a scattering surface formed as a saw teeth on a rear surface, corresponding to the projection surface and scattering the infrared incident inside the light guide bar wherein the upper surface and the scattering surface as ⊏ character except for the projection surface is surrounded by a reflection plate, with which the infrared incident in the light guide bar is avoided being discharged outside through other portions except for the projection surface 210.

The projection surface comprises an incident surface to which the infrared projected from the optical scanner is incident, and a reflection surface which is continuously connected to the incident surface and is shaped as a convex form to reflect the infrared wherein the incident surface and the reflection surface are arranged alternatively in a longitudinal direction of the light guide bar.

The projection surface comprises an incident surface to which the infrared projected from the optical scanner is incident, and a reflection surface which is continuously connected to the incident surface and is shaped as a convex form to reflect the infrared wherein the incident surface and the reflection surface are arranged alternatively in a longitudinal direction of the light guide bar.

Inn the light guide bars faced each other among the light guide bars, the incident surface formed on the projection surface of one side light guide bar and the reflection surface of the other side light guide bar are formed, facing correspondingly each other.

The infrared emitted from the optical scanner passes through the reinforced glass plate or between the reinforced glass plate and the display panel.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
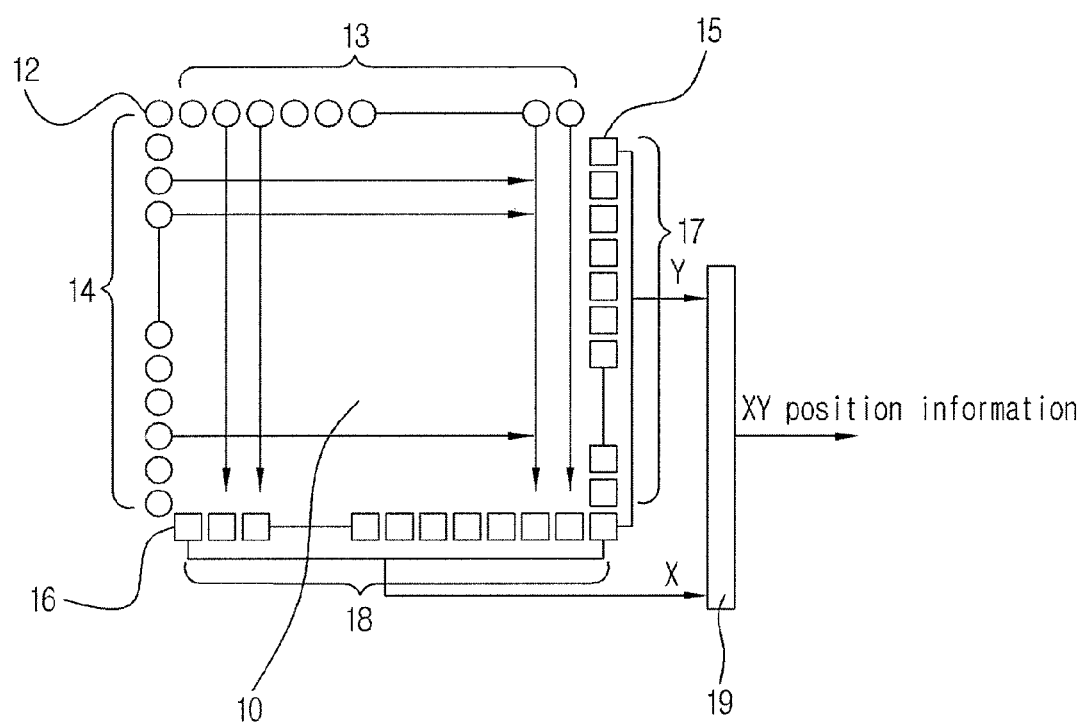
FIG. 1 is a perspective view showing a configuration of an infrared touch screen device according to the related art.
Figure 2:
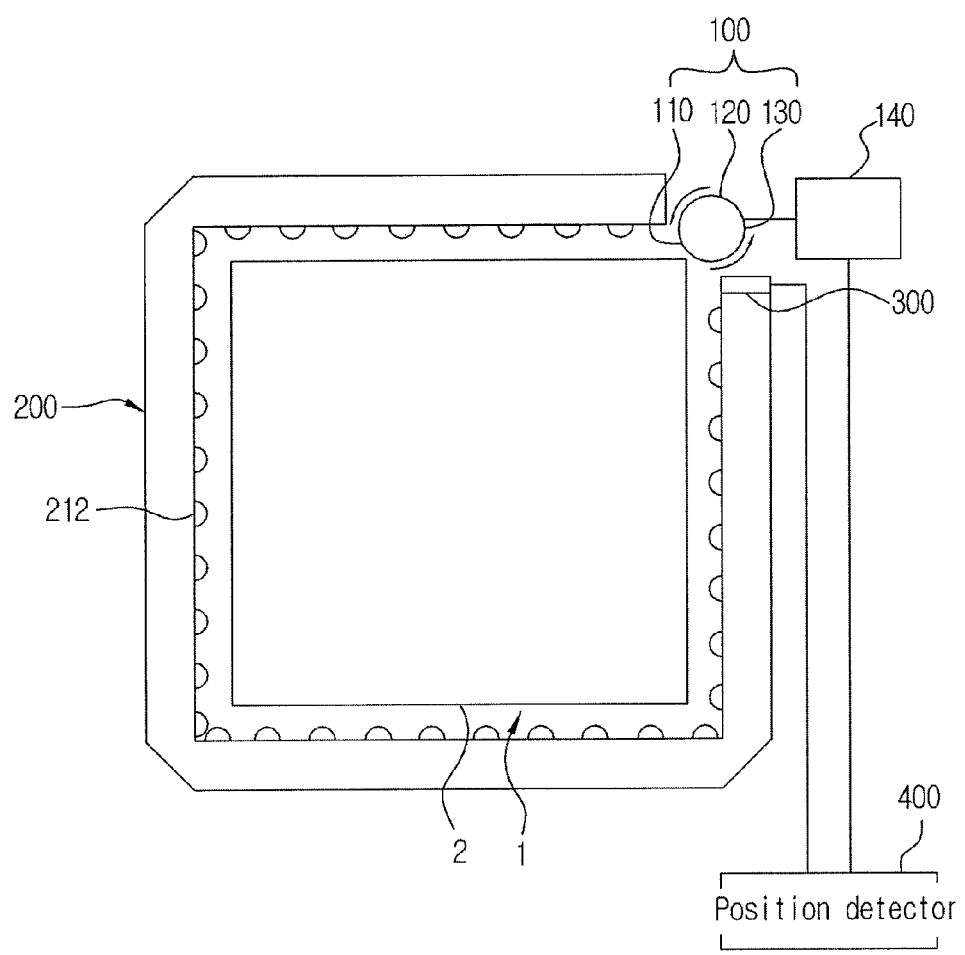
FIG. 2 is a plain view showing an infrared touch screen device capable of sensing multi-touch points according to an exemplary embodiment of the present invention.
Figure 3:
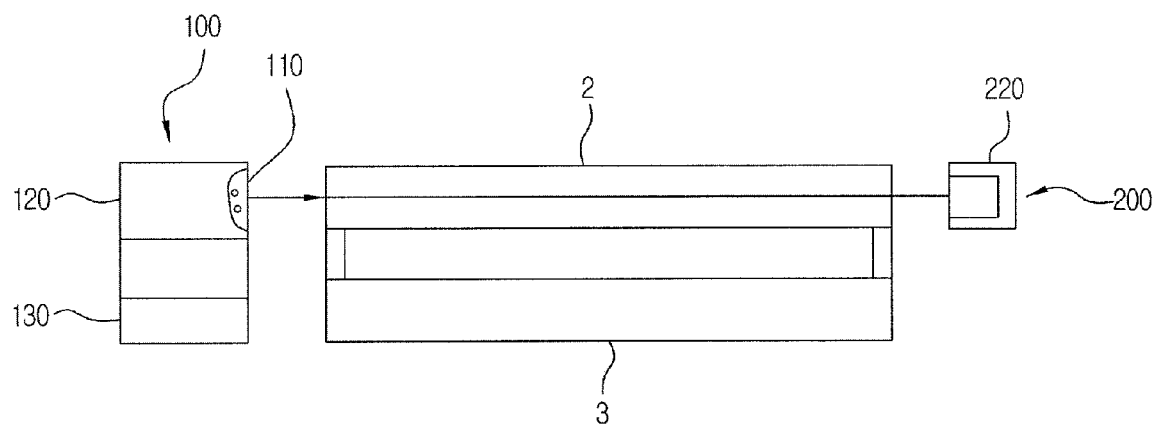
FIG. 3 is a cross-sectional view showing an infrared touch screen device capable of sensing multi-touch points according to an exemplary embodiment of the present invention.

FIG. 2 is a plain view showing an infrared touch screen device capable of sensing multi-touch points according to an exemplary embodiment of the present invention, and FIG. 3 is a cross-sectional view showing an infrared touch screen device capable of sensing multi-touch points according to an exemplary embodiment of the present invention.

Referring to FIGS. 2 and 3, the infrared touch screen device capable of sensing multi-touch points according to an embodiment of the present invention may include a screen 1 configured with a display panel 3 on which image is projected and a reinforced glass plate 2 which is arranged on a front surface of the display panel 3 to protect the display panel 3 and on which a touch is made.

Furthermore, the infrared touch screen may include an optical scanner 100 which is arranged on one side of the screen 10 and scans the screen 10 with infrared, and a light guide bar 200 formed on a border of the reinforced glass plate 2 reflects a part of the infrared which is projected from the optical scanner 100 and passes through the reinforced glass plate 2, and guides the rest infrared not being reflected and in incident inside to transfer it to one end of the screen.

Further, the infrared touch screen device may include a light receiving portion 300 which is arranged on a distal end of the light guide bar 200 and receives the infrared transferred through the light guide bar 200 and a position detector 400 which detects a touch position through a scanning angle of the optical scanner 100 when a light amount received by the light receiving portion 300 is small.

According to the present embodiment of the present invention, the infrared reflected from the light guide bar 200 is in incident correspondingly to the light guide bar 200.

As described above, the optical scanner 100 is provided on one side of corners of the screen 1.

According to one embodiment of the present invention, even though the optical scanner 100 is provided as a singular on one upper corner of the screen 1, the arrangement of the optical scanner is not limited thereto, and the optical scanner 100 may be provided on four corners or at middle parts of the up and down sides or left and right sides of the screen.

In addition, the optical scanner 100 may be configured to have a path so that the infrared is projected to a side of the reinforced glass plate 2 to pass through longitudinally the reinforced glass plate 2.

At this time, in the present embodiment, even though the optical scanner is configured such that the infrared is projected from one side of the optical scanner to pass through the reinforced glass plate 2, the arrangement of the optical scanner is not limited thereto, and the optical scanner may be configured such that the infrared is projected to a space between the reinforced glass plate 2 and the display panel 3.

Figure 4:
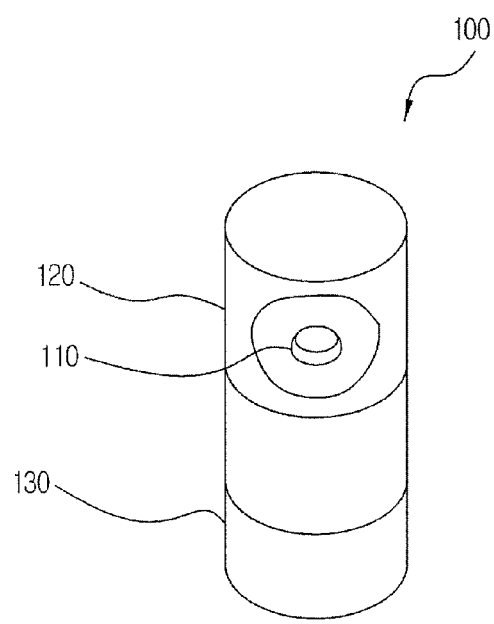
FIG. 4 is a perspective view showing an optical scanner according to an exemplary embodiment of the present invention.
Figure 5:
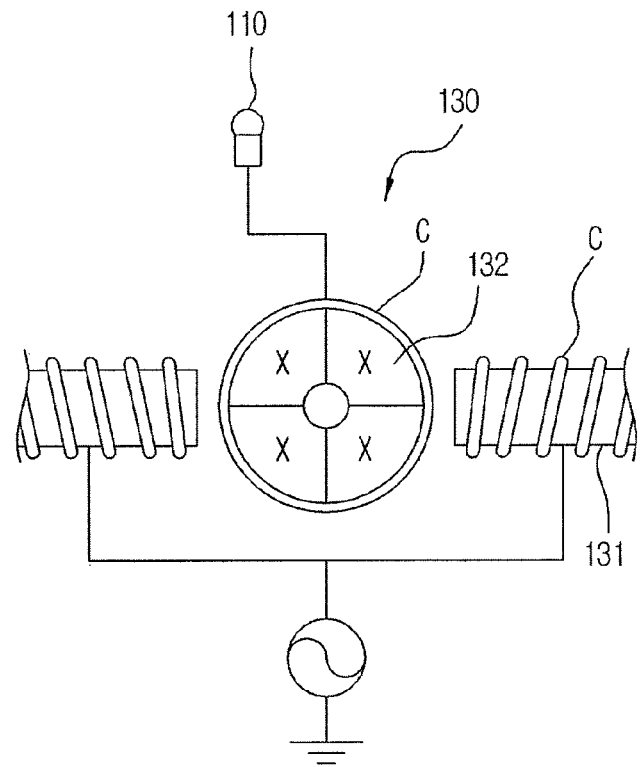
FIG. 5 is a perspective view showing a driving part of the optical scanner according to an exemplary embodiment of the present invention.

FIG. 4 is a perspective view showing an optical scanner according to an exemplary embodiment of the present invention, and FIG. 5 is a perspective view showing a driving part of the optical scanner according to an exemplary embodiment of the present invention.

Referring to FIG. 4, the optical scanner 100 may include an infrared emitting element 110 for receiving power and emitting infrared, a rotation part 120 on one side the infrared emitting element 110 is arranged and which is rotated for the infrared emitted from the infrared emitting element 110 to scan the entire surface of the screen 1, a driving part 130 for rotating the rotation part 120, and an angle measuring part 140 provided on one side of the driving part 130 for measuring a rotation angle of the rotation part 120.

In the forgoing, the infrared emitting element 110 may be formed with an infrared LED consuming less electric power and the driving part 130 may be formed with a motor for receiving power and generating a rotation force.

The rotation part 120 may be shaft-connected rotatively to the driving part 130 wherein the rotation part 120 is rotated by receiving the rotation force produced in the driving part 130.

Here, the rotation part 120, as shown in FIG. 2, is to be rotated in one direction wherein the rotation part is normally and reversely rotated for the infrared to be projected to the entire surface of the screen 1.

That is, as the rotation part 120 is rotated by receiving a rotation force from the driving part 130, the infrared emitted from the infrared emitting element 110 provided in the rotation part 120 is projected to the screen to scan the entire surface of the screen 1.

With respect to a connection configuration of the rotation part 120 and the driving part 130, it may be any configurations, depending on a user's choice, in which a rotation direction of the rotation force produced in the driving part 130 is identical to that of the rotation part 120.

The driving part 130 may be formed with a motor, as shown in FIG. 5, or formed with a magnet to rotate the rotation part 120.

Here, the driving part 130 may be provided rotatively as a circular plate and may includes a rotation magnet 132 for rotating the rotation part 120 in the same direction, and an electromagnet 131 provided on one side of the rotation magnet 132 for receiving power to produce a magnetic field to rotate the rotation magnet 132.

At this time, the rotation magnet 132 may be provided as a circular plate in which an N pole and an S pole in a fan sectional shape are arranged adjacently and alternatively, and further coil C may be wound on an outer peripheral surface thereof to produce induced current depending on a rotation of the rotation magnet 132.

Further, the coil C wound on the rotation magnet 132 is electrically connected to the infrared emitting element 110 to supply the induced current produced in the coil C to the infrared emitting element 110.

Like this, the induced current produced on the coil C is used as a light emitting power source for the infrared emitting element 110.

Accordingly, the touch screen device according to the present embodiment does not need a separate external power source device for supplying power to the infrared emitting element.

Additionally, the driving electromagnet 131 may be provided as a singular on one side of the rotation magnet 132 or as a plural on both sides of the rotation magnet, corresponding to each other.

That is, when power is supplied to the driving electromagnet 131, magnetic power is produced thereon.

As a result, the rotation magnet 132 is rotated by the magnetic power produced in the driving electromagnet 131 to produced the induced current on the coil C wound an outer peripheral surface of the rotation magnet 132.

At this time, the induced current produced on the coil C may be used as a power source of the infrared emitting element 110.

Accordingly, a separate external power source for operating the infrared emitting element 110 is not necessary to save power consumption and further additional devices to be used for the external power source is not also necessary to save manufacturing cost and maintenance cost.

Additionally, the screen 1 is scanned with infrared while the rotation portion 120 rotates, and thus the infrared stably scans the screen 1 even in case that the rotation portion 120 is swayed.

Figure 6:
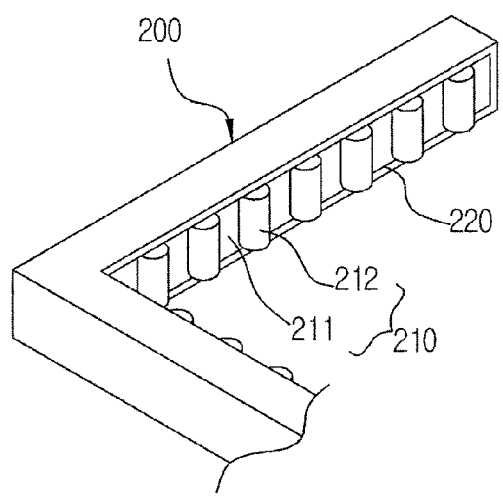
FIG. 6 is a part-perspective view showing a light guide bar according to an exemplary embodiment of the present invention.
Figure 7:
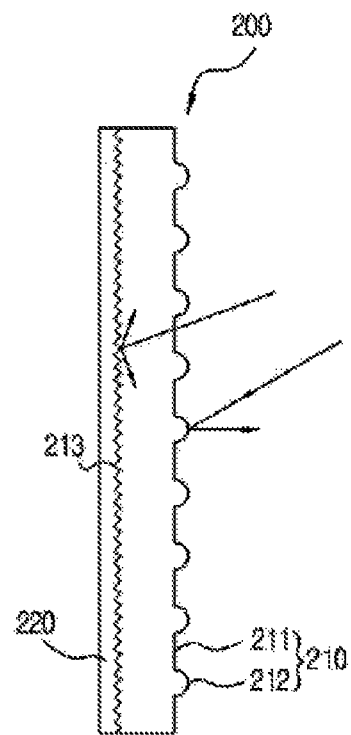
FIG. 7 is a perspective view showing the infrared being in incident or reflected to the light guide bar according to an exemplary embodiment of the present invention.

FIG. 6 is a part-perspective view showing a light guide bar according to an exemplary embodiment of the present invention, and FIG. 7 is a perspective view showing the infrared being in incident or reflected to the light guide bar according to an exemplary embodiment of the present invention.

Referring to FIGS. 6 and 7, the light guide bar 200 may include a projection surface 210 to which the infrared emitted from the scanner 100 is projected, and a scattering surface 213 which is formed as a saw teeth form on a rear surface of the light guide bar and from which the infrared is scattered.

Furthermore, the light guide bar 200 may further include a reflection plate 220 which surrounds the upper surface and the scattering surface 213 as "⌐" character except for the projection surface 210, with which the infrared incident in the light guide bar 200 is avoided being discharged outside through other portions except for the projection surface 210.

The light guide bar 200 may be arranged on a border of the screen 1.

As a result, the infrared projected from the optical scanner 100 passes through the reinforced glass plate 2 and scans the screen 1 to be projected.

Here, the light guide bar 200 may guide the infrared incident inside therein not to be discharged outside and transfer the infrared for being received to the light receiving portion 300 formed one end of the light guide bar 200.

The light guide bar 200 may be formed as a cylinder form or a bar form having arbitrary angle form with polymethylmethacrylate (PMMA), or the like having a good total reflection property with respect to infrared wavelength and further may be easily processed and installed depending on a size of the screen 1.

Further, the projection surface 210 of the light guide bar 200 may be arranged adjacent to the reinforced glass plate 2.

The projection surface 210 may include an incident surface 211 into which the infrared projected from the optical scanner 100 is incident, and a reflection surface 212 which is formed to be continuously connected to the incident surface 211 and protruded and from which the infrared passed through the reinforced glass plate 2 is reflected.

The incident surface 211 may be formed as a flat form and transparent for the infrared to be incident, and further the reflection surface 212 may be formed with material for the infrared to be reflected.

At this time, the incident surface 211 and the reflection surface 212 may be alternatively arranged in a longitudinal direction of the projection surface 210 of the light guide bar 200.

The light guide bars 200 faced each other among the light guide bars 200 as described in the forgoing is configured such that the incident surface 211 formed on the projection surface 211 of one side light guide bar 200 and the reflection surface 212 of the other side light guide bar 212 are faced correspondingly.

That is, when the infrared projected from the optical scanner 100 passes through the reinforced glass plate 2 and scans the screen 1 to arrive at the projection surface 210, the infrared projected to the incident surface 211 is to be incident inside the light guide bar 200.

Further, the infrared arrived at the reflection surface 212 is reflected to the screen 1 to be incident to the incident surface 211 of the light guide bar 200 which is formed at a faced location.

Accordingly, the infrared reflected from the reflection surface 212 secondly scans the screen 1 as a matrix form.

Additionally, the scattering surface 213 may be formed as a saw teeth on a rear surface of the light guide bar 200 to be corresponded to the projection surface 210 wherein the infrared incident inside the light guide bar 200 through the incident surface 211 is reflected in a scattering manner to be propagated to the both ends of the light guide bar 200.

Meanwhile, when the infrared projected from the optical scanner 100 scans the screen 1 and is incident inside the light guide bar 200 through the incident surface 211, the infrared is avoided being projected outside through the up and down surfaces or rear surface of the light guide bar 2, and is received to the light receiving portion 300 through the reflection plate 220 to improve a light receiving efficiency of the light receiving portion 300.

At this time, the reflection plate 220 is arranged on one end of the light guide plate 200 among both ends thereof to reflect the infrared and the light receiving portion 300 is arranged on the other end of the light guide bar 200 to receive the infrared transferred through the light guide bar 200 and measure the amount of the received light.

At this time, a light collecting lens (not shown) may be arranged between the light guide bar 200 and the light receiving portion 300 to increase a light receiving efficiency of the light receiving portion 300.

In the embodiments of the present invention, even though the light receiving portion 300 may be arranged on one end of the light guide bar 200, the light receiving bars 300 may be provided on both ends of the light guide bar 200, respectively, to receive the infrared.

Figure 8:
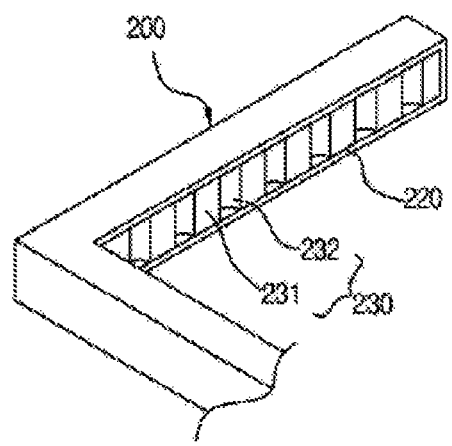
FIG. 8 is a part-perspective view showing a light guide bar according to another exemplary embodiment of the present invention.

Additionally, the light guide bar 200 may be provided as other modified embodiments, as shown in FIG. 8.

FIG. 8 is a part-perspective view showing a light guide bar according to another exemplary embodiment of the present invention.

Referring to FIG. 8, the projection surface 230 of the light guide bar 200 may include an incident surface 231 into which the infrared is incident, and a reflection surface 232 which is continuously connected to the incident surface 231 and is in convex form to reflect the infrared wherein the incident surface 231 and the reflection surface 232 are arranged alternatively in a longitudinal direction.

Figure 9:
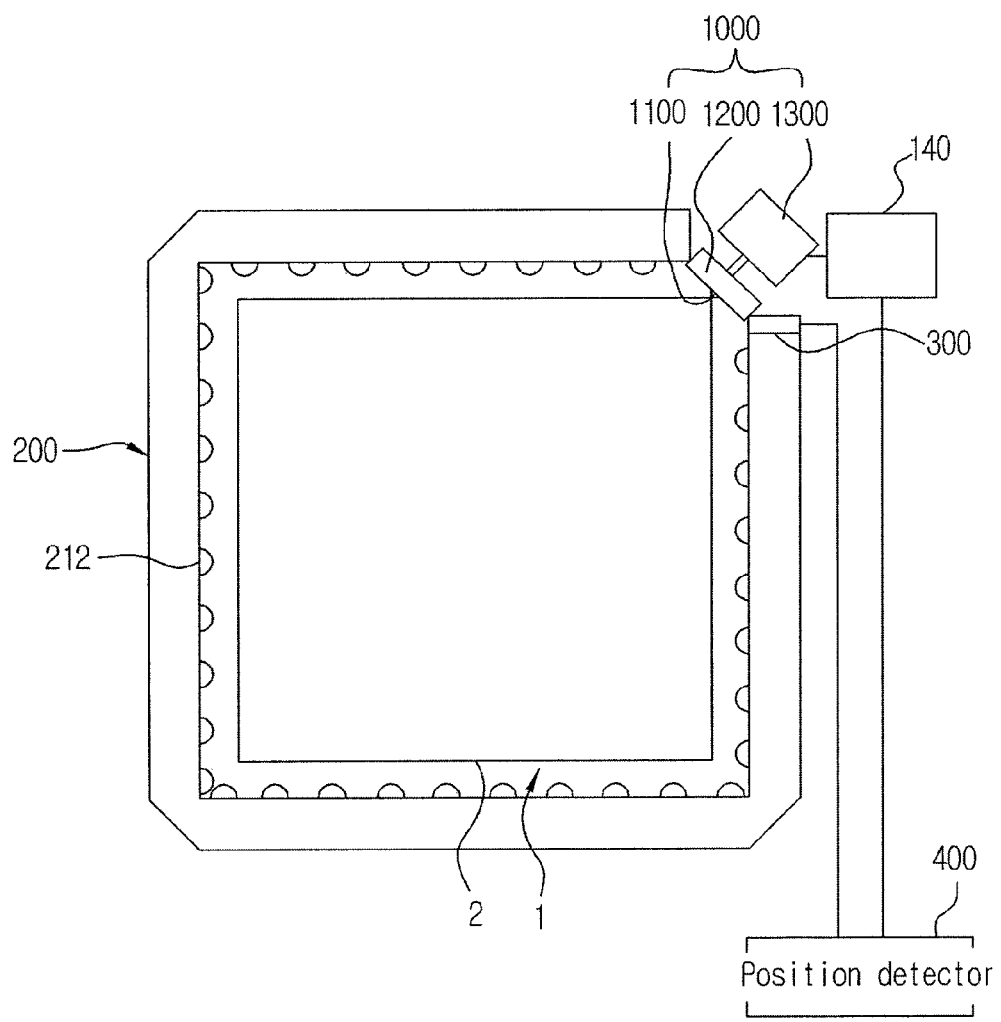
FIG. 9 is a plain view showing an infrared touch screen device capable of sensing multi-touch points according to a second exemplary embodiment of the present invention.
Figure 10:
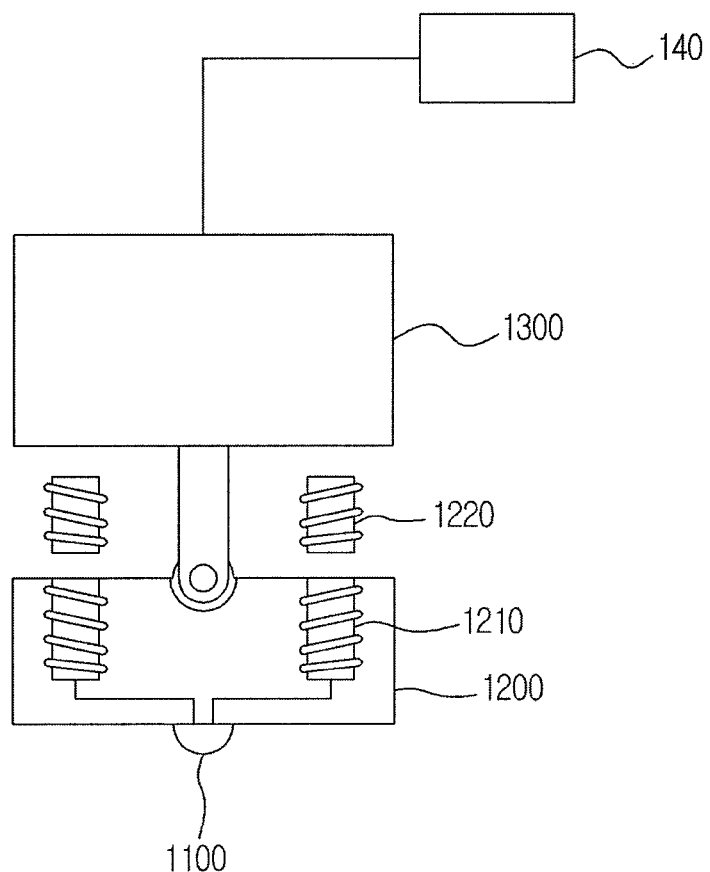
FIG. 10 is a perspective view showing an optical scanner according to a second exemplary embodiment of the present invention.

FIG. 9 is a plain view showing an infrared touch screen device capable of sensing multi-touch points according to a second exemplary embodiment of the present invention. FIG. 10 is a perspective view showing an optical scanner according to a second exemplary embodiment of the present invention.

The optical scanner 100 as described in the forgoing according to an embodiment of the present invention is rotated in one direction, or normal or reverse direction to scan the screen 1, however, the optical scanner 1000 according to the second embodiment is rotated in both directions to scan the screen 1.

Referring to FIG. 9, the optical scanner 1000 may include an infrared emitting element 1100 for emitting infrared, a rotation portion 1200 which is rotated in both direction for the infrared emitted from the infrared emitting element 1100 to scan the entire surface of the screen 1, a driving part 1300 for rotating the rotation part 1200 in both direction, and a angle measuring part 1400 which is provided on one side of the driving part 1300 and measures a rotation angle of the rotation part 1200.

The infrared emitting element 1100 may be provided on one side of the rotation part 1200 and the driving part 1300 may be connected to a rear side of the rotation part 1200. At this time, the driving part 1300 may be formed with a motor. As the motor rotates in both directions, the rotation part 1200 is rotated in both directions at a predetermined angle.

That is, as the rotation part 1200 is rotated in both directions by the driving part 1300, the infrared emitted from the infrared emitting element 1100 provided on one side of the rotation part 1200 is scanned in both directions, corresponding to the rotation direction of the rotation part 1200, to scan the entire surface of the screen 1.

Here, as shown in FIG. 10, the driving part 1300 may rotate the rotation part 1200 in both directions by using an electromagnet instead of a motor.

At this time, the driving part 1300 may include a rotation electromagnet 1210 provided inside the rotation part 1200, and a stationary electromagnet 1220 which is provided on a rear side of the rotation part 1200, corresponding to the rotation electromagnet 1210 and receives power to produce magnetic power.

Here, the rotation electromagnet 1210 and the stationary electromagnet 1220 may provided as a plural, as shown in FIG. 10.

The stationary electromagnet 1220 may be controlled by a controller (not shown) to alternatively apply the power to produce a magnetic power.

As a result, the rotation electromagnet 1210 may contact the stationary electromagnet 1220 having the magnetic power with alternative polarity and thus the rotation part is rotated in both directions.

At this time, when the stationary electromagnet 1220 alternatively has a magnetic power, the induced current is produced, and the induced current is transferred to the rotation electromagnet 1210 to be used as a power source of the infrared emitting element 110 when the rotation electromagnet 1210 contacts the stationary electromagnet 1220.

Accordingly, the infrared emitting element 1100 is operated through the induced current produced through alternative movement of the stationary electromagnet 1220 and the rotation electromagnet 1210, without separate external power source to save power consumption and further addition devices for using the external power source is omitted to save a manufacturing cost and maintenance cost is reduced.

The operation of the infrared touch screen capable of sensing multi-touch points according to an embodiment of the present invention will be described with reference to the drawings.

Figure 11:
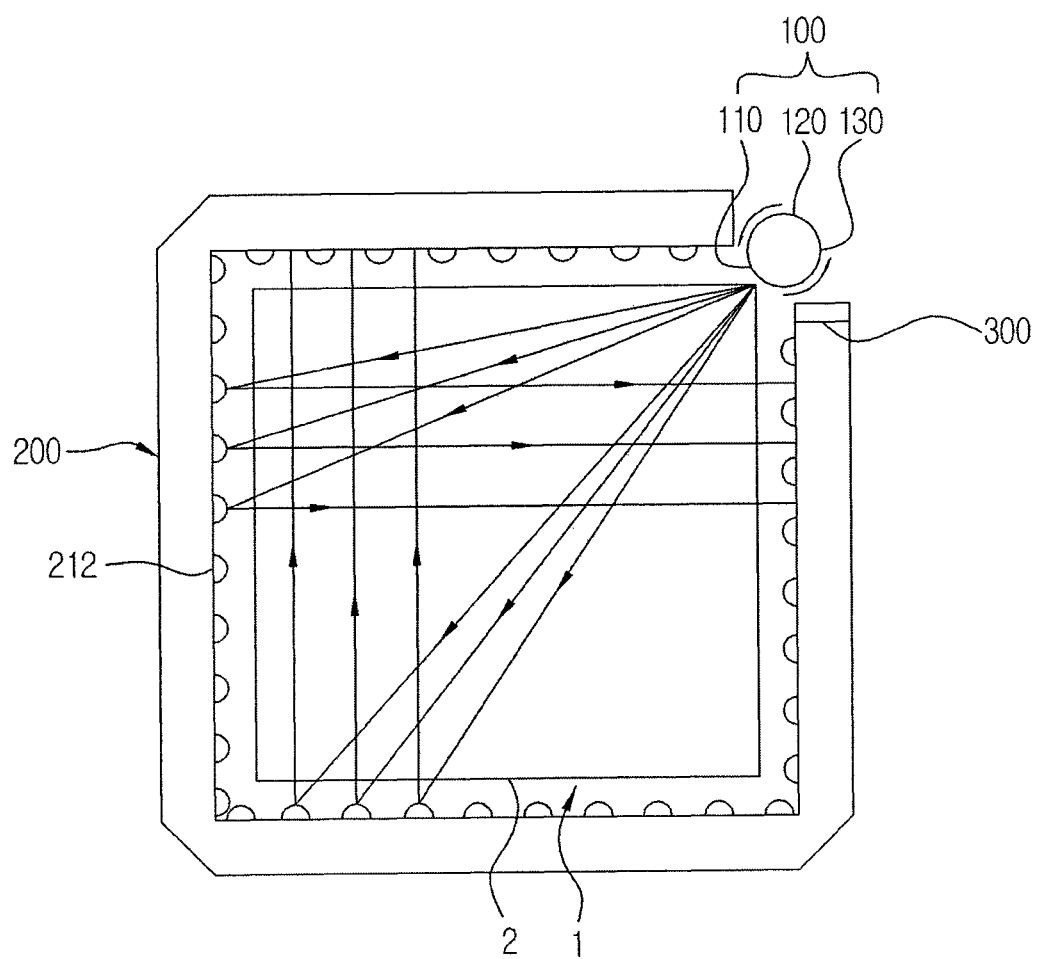
FIGS. 11-13 are plain views showing operations of the infrared touch screen devices capable of sensing multi-touch points according to an exemplary embodiment of the present invention.
Figure 12:
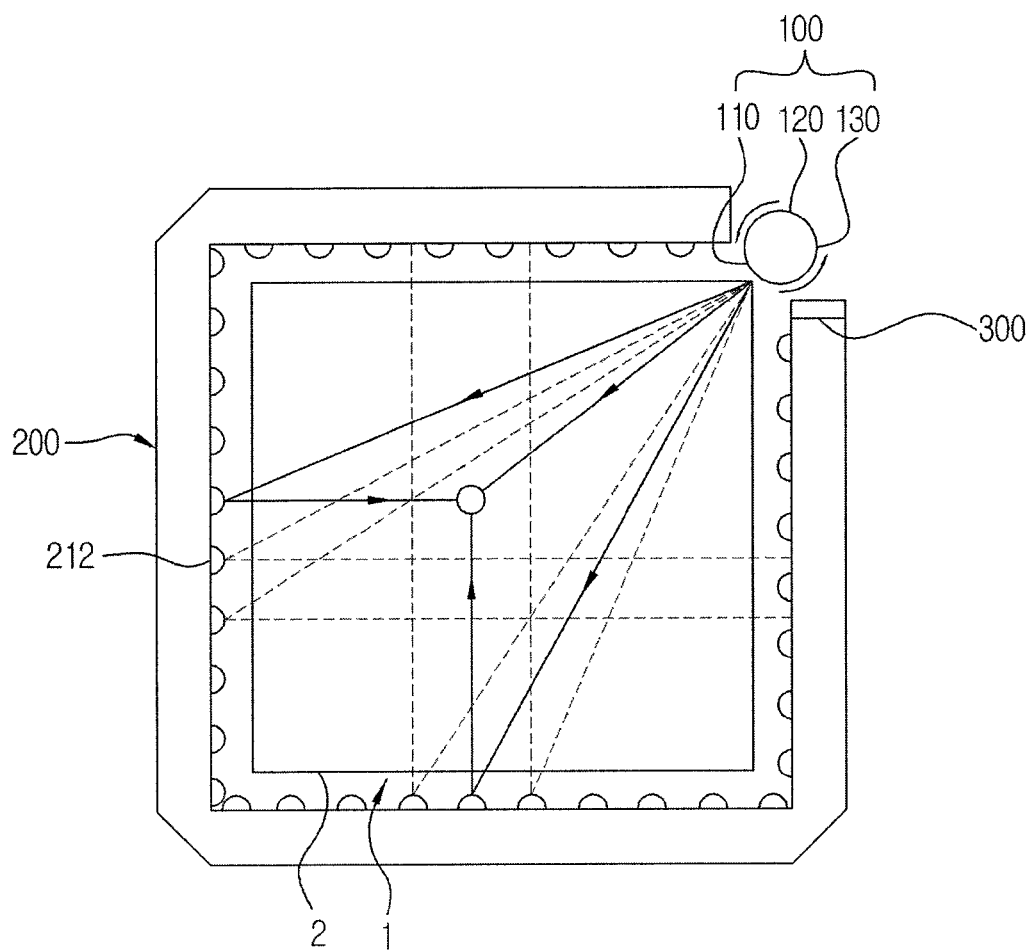
Figure 13:
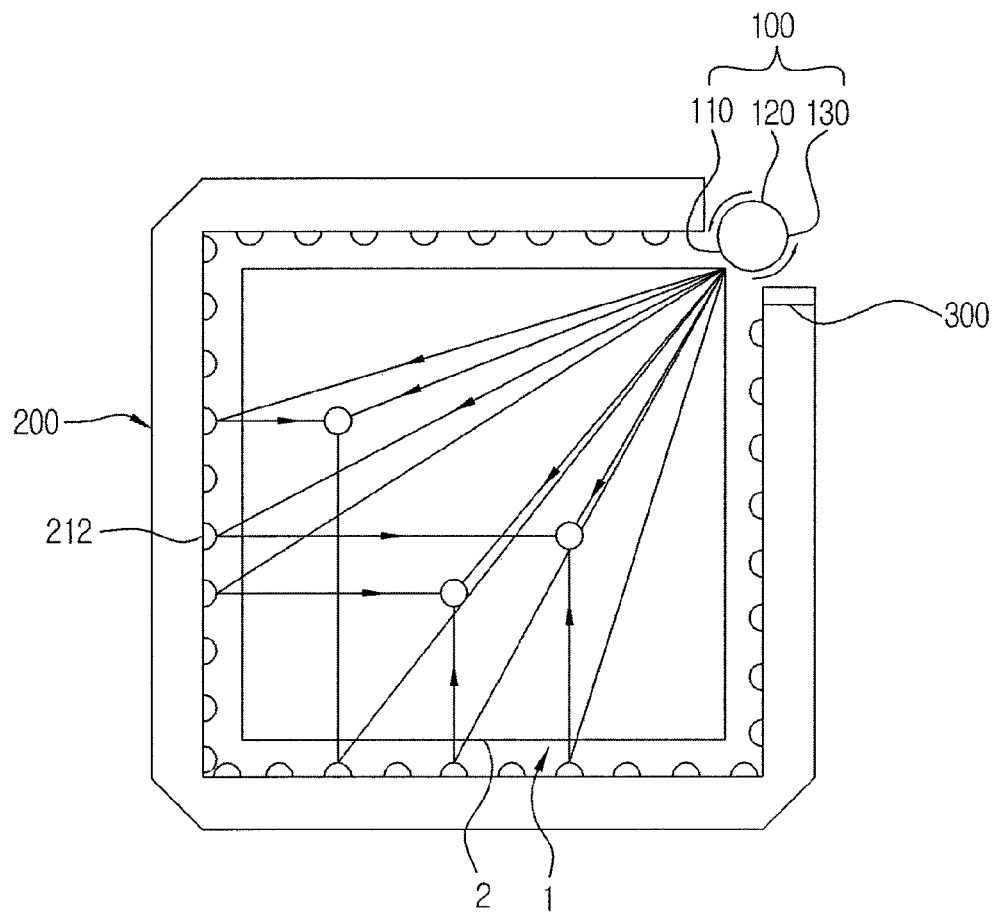

FIGS. 11-13 are plain views showing operations of the infrared touch screen devices capable of sensing multi-touch points according to an exemplary embodiment of the present invention.

Referring to FIG. 11, as the rotation part 120 is rotated in one direction by the driving part 130, the optical scanner 100 scans the entire surface of the screen 1 such that the infrared emitted from the infrared emitting element 110 provided on one side of the rotation part 120 is projected in the same direction as a rotation of the rotation part 120 to pass through the reinforced glass plate 2.

Here, when the infrared which has scanned the screen 1 arrives at the projection surface 210 of the light guide bar 200, the infrared incident to the incident surface 211 is incident inside the light guide bar 200 to be scattered by the scattering surface 213 provided on a rear surface of the light guide bar 200, and is propagated to the both ends of the light guide bar 200 through a diffused reflection to be received in the light receiving part 300 provided on one end of the light guide bar 200.

Meanwhile, the infrared projected to the reflection surface 212 is reflected again to the screen 1 to be incident to the incident surface 211 of the light guide bar 200 provided at a face location and thus the infrared reflected on the reflection surface 212 scans secondly the screen 1 as a matrix form.

At this time, as shown in FIG. 12, when one point of the reinforced glass plate 2 is touched through an object such as a finger or a touch pen, the infrared the infrared passing the area touched through the reinforced glass plate 2 and emitted from the optical scanner 100 can not pass smoothly through the touched area due to a shadow or interruption of the touched object for the light receiving portion to receive a little amount of light.

Further, the infrared which is reflected from the reflection surface 212 of the light guide bar 200 and scans secondly the screen as a matrix form can not also pass smoothly for the light receiving portion to receive a little amount of light.

That is, when the touch point is formed by an object, the little amount of light is received at the moment while the infrared is received continuously to the light receiving portion 300, and at this time the touch point is detected by a rotation angle of the optical scanner 100 measured through the angle measuring device 130.

Additionally, as shown in FIG. 13, even three touch points are formed on the reinforced glass plate 2, the touch points are to be detected through the aforementioned way.

As described in the forgoing, according to the infrared touch screen capable of sensing multi-touch points, the screen is secondly scanned through the infrared reflected to of the incident surface of the other side light guide bar formed faced to the reflection surface of one side light guide bar and thus even multi touch points are formed, the contact positions can be exactly detected.

Further, the reinforced glass plate is provided on the entire surface of the screen and thus the damage to the screen can be avoided since an object such as a user' finger or a pen is to touch the reinforced glass plate, instead of the screen.

Additionally, the touch point position can be exactly detected through small numbers of the infrared emitting element and the light receiving element by using the rotating infrared scanner.

Further, the induced current produced through an electromagnet is used as a power source of the infrared emitting element and thus separate external power source is not used to decrease power consumption.

In addition, additional devices for using the external power source is omitted to save a manufacturing cost and maintenance cost.

While the invention has been shown and described with reference to exemplary embodiments thereof, it will be understood by those skilled in the art that various changes in form and details may be made therein without departing from the spirit and scope of the invention as defined by the appended claims and their equivalents.

What is claimed is:

1. An infrared touch screen capable of sensing multi touch points, the infrared touch screen comprising:
   a screen provided with a display panel on which an image is projected and a reinforced glass plate formed on a front surface of the display panel and protects the display panel and to which the touch is made;
   an optical scanner formed on one side of the screen and scanning the screen with the infrared;
   a light guide bar formed on a border of the reinforced glass plate and reflecting a part of the infrared which is projected from the optical scanner and passes through the reinforced glass plate, and guiding the rest non-reflected infrared incident inside the reinforced glass plate and transferring to one end thereof;
   a light receiving portion provided on a distal end of the light guide bar and receiving the infrared which is transferred through the light guide bar; and
   a position detector for detecting the touch position with a scanning angle of the optical scanner when the amount of the light received in the light receiving portion is a little wherein the infrared reflected from the light guide bar in incident to other light guide bars which are formed, corresponding to the light guide bar reflecting the infrared, wherein the optical scanner comprises:
an infrared emitting element for emitting infrared;
a rotation part for rotating the infrared emitted from the infrared emitting element and scanning the entire area of the screen,
a driving part for applying a rotation force to the rotation part, and
an angle measuring part provided on one side of the driving part for measuring a rotation angle of the rotation part, and wherein the driving part comprises:
a rotation magnet formed rotatively as a circular plate and forming the rotation part in a same direction, and
a driving electromagnet provided on one side of the rotation magnet and receiving power to produce a magnetic power and rotating the rotation part.

2. The infrared touch screen capable of sensing multi touch points of claim 1, wherein the driving part is formed with a motor.

3. The infrared touch screen capable of sensing multi touch points of claim 1, wherein the light guide bar comprises:
a projection surface on which the infrared emitted from the optical scanner is projected; and
a scattering surface formed as a saw teeth on a rear surface, corresponding to the projection surface and scattering the infrared incident inside the light guide bar wherein the upper surface and the scattering surface as "⌐" character except for the projection surface is surrounded by a reflection plate, with which the infrared incident in the light guide bar is avoided being discharged outside through other portions except for the projection surface 210.

4. The infrared touch screen capable of sensing multi touch points of claim 3, wherein the projection surface comprises:
an incident surface to which the infrared projected from the optical scanner is incident; and
a reflection surface which is continuously connected to the incident surface and is shaped as a convex form to reflect the infrared wherein the incident surface and the reflection surface are arranged alternatively in a longitudinal direction of the light guide bar.

5. The infrared touch screen capable of sensing multi touch points of claim 4, wherein in the light guide bars faced each other among the light guide bars, the incident surface formed on the projection surface of one side light guide bar and the reflection surface of the other side light guide bar are formed, facing correspondingly each other.

6. The infrared touch screen capable of sensing multi touch points of claim 1, wherein the infrared emitted from the optical scanner passes through a side part of the reinforced glass plate or between the reinforced glass plate and the display panel.

7. The infrared touch screen capable of sensing multi touch points of claim 1, wherein the infrared emitting element receives the induced current produced in the rotation magnet to emit infrared.

8. An infrared touch screen capable of sensing multi touch points, the infrared touch screen comprising:
a screen provided with a display panel on which an image is projected and a reinforced glass plate formed on a front surface of the display panel and protects the display panel and to which the touch is made;
an optical scanner formed on one side of the screen and scanning the screen with the infrared;
a light guide bar formed on a border of the reinforced glass plate and reflecting a part of the infrared which is projected from the optical scanner and passes through the reinforced glass plate, and guiding the rest non-reflected infrared incident inside the reinforced glass plate and transferring to one end thereof;
a light receiving portion provided on a distal end of the light guide bar and receiving the infrared which is transferred through the light guide bar; and
a position detector for detecting the touch position with a scanning angle of the optical scanner when the amount of the light received in the light receiving portion is a little wherein the infrared reflected from the light guide bar in incident to other light guide bars which are formed, corresponding to the light guide bar reflecting the infrared, wherein the optical scanner comprises:
an infrared emitting element for emitting infrared;
a rotation part which is rotated in both directions for the infrared emitted from the infrared emitting element to scan the entire area of the screen,
a driving part for rotating the rotation part in both directions, and
an angle measuring part provided on one side of the driving part for measuring a rotation angle of the rotation part, and wherein the driving part comprises:
a rotation electromagnet provided inside the rotation part and receiving power to produce a magnetic force, and
a stationary magnet provided on a rear side of the rotation part, correspondingly to the rotation electromagnet and receiving power to produce a magnetic force.

9. The infrared touch screen capable of sensing multi touch points of claim 8, wherein the driving part is formed with a motor.

10. The infrared touch screen capable of sensing multi touch points of claim 8, wherein the infrared emitting element receives the induced current produced in the stationary magnet to emit infrared.

11. The infrared touch screen capable of sensing multi touch points of claim 8, wherein the light guide bar comprises:
a projection surface on which the infrared emitted from the optical scanner is projected; and
a scattering surface formed as a saw teeth on a rear surface, corresponding to the projection surface and scattering the infrared incident inside the light guide bar wherein the upper surface and the scattering surface as "⌐" character except for the projection surface is surrounded by a reflection plate, with which the infrared incident in the light guide bar is avoided being discharged outside through other portions except for the projection surface 210.

12. The infrared touch screen capable of sensing multi touch points of claim 11, wherein the projection surface comprises:
an incident surface to which the infrared projected from the optical scanner is incident; and
a reflection surface which is continuously connected to the incident surface and is shaped as a convex form to reflect the infrared wherein the incident surface and the reflection surface are arranged alternatively in a longitudinal direction of the light guide bar.

13. The infrared touch screen capable of sensing multi touch points of claim 12, wherein in the light guide bars faced each other among the light guide bars, the incident surface formed on the projection surface of one side light guide bar and the reflection surface of the other side light guide bar are formed, facing correspondingly each other.

* * * * *